US010783131B1

(12) United States Patent
Sanvido et al.

(10) Patent No.: US 10,783,131 B1
(45) Date of Patent: *Sep. 22, 2020

(54) DEDUPLICATING PATTERNED DATA IN A STORAGE SYSTEM

(71) Applicant: Pure Storage, Inc., Mountain View, CA (US)

(72) Inventors: Marco Sanvido, Belmont, CA (US); Richard Hankins, San Jose, CA (US); John Hayes, Mountain View, CA (US); Steve Hodgson, Sunnyvale, CA (US); Feng Wang, Sunnyvale, CA (US); Sergey Zhuravlev, Bellingham, WA (US); Andrew Kleinerman, Belmont, CA (US)

(73) Assignee: Pure Storage, Inc., Mountain View, CA (US)

( * ) Notice: Subject to any disclaimer, the term of this patent is extended or adjusted under 35 U.S.C. 154(b) by 239 days.

This patent is subject to a terminal disclaimer.

(21) Appl. No.: 15/861,279

(22) Filed: Jan. 3, 2018

Related U.S. Application Data

(63) Continuation of application No. 14/569,624, filed on Dec. 12, 2014, now Pat. No. 9,864,769.

(51) Int. Cl.
*G06F 16/22* (2019.01)
*G06F 3/06* (2006.01)

(52) U.S. Cl.
CPC ........ *G06F 16/2237* (2019.01); *G06F 3/0608* (2013.01); *G06F 3/0641* (2013.01); *G06F 3/067* (2013.01)

(58) Field of Classification Search
CPC .............. G06F 16/2237; G06F 16/174; G06F 16/1748; G06F 3/0608; G06F 3/0641; G06F 3/067
(Continued)

(56) References Cited

U.S. PATENT DOCUMENTS

| 4,586,027 A | 4/1986 | Tsukiyama et al. |
| 5,208,813 A | 5/1993 | Stallmo |

(Continued)

FOREIGN PATENT DOCUMENTS

| CN | 103370685 A | 10/2013 |
| CN | 103370686 A | 10/2013 |

(Continued)

OTHER PUBLICATIONS

Microsoft Corporation, "GCSettings.IsServerGC Property", Retrieved Oct. 27, 2013 via the WayBack Machine, 3 pages.
(Continued)

*Primary Examiner* — Hares Jami (57) ABSTRACT

A system and method for efficiently storing data in a storage system. A data storage subsystem includes multiple data storage locations on multiple storage devices in addition to at least one mapping table. A data storage controller determines whether data to store in the storage subsystem has one or more patterns of data intermingled with non-pattern data within an allocated block. Rather than store the one or more pattern on the storage devices, the controller stores information in a header on the storage devices. The information includes at least an offset for the first instance of a pattern, a pattern length, and an identification of the pattern. The data may be reconstructed for a corresponding read request from the information stored in the header.

20 Claims, 6 Drawing Sheets

(58) Field of Classification Search
USPC .......................... 707/692, 693, 745
See application file for complete search history.

(56) References Cited

U.S. PATENT DOCUMENTS

| | | | |
|---|---|---|---|
| 5,403,639 A | 4/1995 | Belsan | |
| 5,715,446 A | 2/1998 | Kinoshita et al. | |
| 5,940,838 A | 8/1999 | Schmuck et al. | |
| 6,263,350 B1 | 7/2001 | Wollrath et al. | |
| 6,412,045 B1 | 6/2002 | DeKoning et al. | |
| 6,718,448 B1 | 4/2004 | Ofer | |
| 6,757,769 B1 | 6/2004 | Ofer | |
| 6,799,283 B1 | 9/2004 | Masaaki et al. | |
| 6,834,298 B1 | 12/2004 | Singer et al. | |
| 6,850,938 B1 | 2/2005 | Sadjadi | |
| 6,915,434 B1 | 7/2005 | Kuroda | |
| 6,973,549 B1 | 12/2005 | Testardi | |
| 7,028,216 B2 | 4/2006 | Aizawa et al. | |
| 7,028,218 B2 | 4/2006 | Schwarm et al. | |
| 7,039,827 B2 | 5/2006 | Meyer et al. | |
| 7,216,164 B1 | 5/2007 | Whitmore et al. | |
| 7,783,682 B1 | 8/2010 | Patterson | |
| 7,873,619 B1 | 1/2011 | Faibish et al. | |
| 7,913,300 B1 | 3/2011 | Flank et al. | |
| 7,933,936 B2 | 4/2011 | Aggarwal et al. | |
| 7,979,613 B2 | 7/2011 | Zohar et al. | |
| 8,086,652 B1 | 12/2011 | Bisson et al. | |
| 8,117,464 B1 | 2/2012 | Kogelnik | |
| 8,205,065 B2 | 6/2012 | Matze | |
| 8,352,540 B2 | 1/2013 | Anglin et al. | |
| 8,527,544 B1 | 9/2013 | Colgrove et al. | |
| 8,560,747 B1 | 10/2013 | Tan et al. | |
| 8,621,241 B1 | 12/2013 | Stephenson | |
| 8,700,875 B1 | 4/2014 | Barron et al. | |
| 8,751,463 B1 | 6/2014 | Chamness | |
| 8,806,160 B2 | 8/2014 | Colgrove et al. | |
| 8,874,850 B1 | 10/2014 | Goodson et al. | |
| 8,959,305 B1 | 2/2015 | Lecrone et al. | |
| 9,423,967 B2 | 8/2016 | Colgrove et al. | |
| 9,436,396 B2 | 9/2016 | Colgrove et al. | |
| 9,436,720 B2 | 9/2016 | Colgrove et al. | |
| 9,454,476 B2 | 9/2016 | Colgrove et al. | |
| 9,454,477 B2 | 9/2016 | Colgrove et al. | |
| 9,513,820 B1 | 12/2016 | Shalev | |
| 9,516,016 B2 | 12/2016 | Colgrove et al. | |
| 9,552,248 B2 | 1/2017 | Miller et al. | |
| 2002/0038436 A1 | 3/2002 | Suzuki | |
| 2002/0087544 A1 | 7/2002 | Selkirk et al. | |
| 2002/0178335 A1 | 11/2002 | Selkirk et al. | |
| 2003/0001686 A1 | 1/2003 | Sekiya | |
| 2003/0140209 A1 | 7/2003 | Testardi | |
| 2004/0010655 A1 | 1/2004 | Tanaka et al. | |
| 2004/0049572 A1 | 3/2004 | Yamamoto et al. | |
| 2005/0066095 A1 | 3/2005 | Mullick et al. | |
| 2005/0216535 A1 | 9/2005 | Saika et al. | |
| 2005/0223154 A1 | 10/2005 | Uemura | |
| 2006/0074940 A1 | 4/2006 | Craft et al. | |
| 2006/0136365 A1 | 6/2006 | Kedem et al. | |
| 2006/0155946 A1 | 7/2006 | Ji | |
| 2007/0067585 A1 | 3/2007 | Ueda et al. | |
| 2007/0162954 A1 | 7/2007 | Pela | |
| 2007/0171562 A1 | 7/2007 | Maejima et al. | |
| 2007/0174673 A1 | 7/2007 | Kawaguchi et al. | |
| 2007/0220313 A1 | 9/2007 | Katsuragi et al. | |
| 2007/0245090 A1* | 10/2007 | King | G06F 12/0813 711/129 |
| 2007/0266179 A1 | 11/2007 | Chavan et al. | |
| 2008/0059699 A1 | 3/2008 | Kubo et al. | |
| 2008/0065852 A1 | 3/2008 | Moore et al. | |
| 2008/0134174 A1 | 6/2008 | Sheu et al. | |
| 2008/0141279 A1* | 6/2008 | Mattson | G06F 8/453 719/313 |
| 2008/0155191 A1 | 6/2008 | Anderson et al. | |
| 2008/0178040 A1 | 7/2008 | Kobayashi | |
| 2008/0209096 A1 | 8/2008 | Lin et al. | |
| 2008/0244205 A1 | 10/2008 | Amano et al. | |
| 2008/0275928 A1 | 11/2008 | Shuster | |
| 2008/0285083 A1 | 11/2008 | Aonuma | |
| 2008/0307270 A1 | 12/2008 | Li | |
| 2009/0006587 A1 | 1/2009 | Richter | |
| 2009/0037662 A1 | 2/2009 | La Frese et al. | |
| 2009/0204858 A1 | 8/2009 | Kawaba | |
| 2009/0228648 A1 | 9/2009 | Wack | |
| 2009/0300084 A1 | 12/2009 | Whitehouse | |
| 2010/0057673 A1 | 3/2010 | Savov | |
| 2010/0058026 A1 | 3/2010 | Heil et al. | |
| 2010/0067706 A1 | 3/2010 | Anan et al. | |
| 2010/0077205 A1 | 3/2010 | Ekstrom et al. | |
| 2010/0082879 A1 | 4/2010 | McKean et al. | |
| 2010/0095162 A1 | 4/2010 | Inakoshi | |
| 2010/0106905 A1 | 4/2010 | Kurashige et al. | |
| 2010/0153620 A1 | 6/2010 | McKean et al. | |
| 2010/0153641 A1 | 6/2010 | Jagadish et al. | |
| 2010/0191897 A1 | 7/2010 | Zhang et al. | |
| 2010/0250802 A1 | 9/2010 | Waugh et al. | |
| 2010/0250882 A1 | 9/2010 | Hutchison et al. | |
| 2010/0281225 A1 | 11/2010 | Chen et al. | |
| 2010/0287327 A1 | 11/2010 | Li et al. | |
| 2011/0072300 A1 | 3/2011 | Rousseau | |
| 2011/0145598 A1 | 6/2011 | Smith et al. | |
| 2011/0161559 A1* | 6/2011 | Yurzola | G06F 3/0608 711/103 |
| 2011/0167221 A1 | 7/2011 | Pangal et al. | |
| 2011/0218972 A1* | 9/2011 | Tofano | G06F 16/1752 707/692 |
| 2011/0238634 A1 | 9/2011 | Kobara | |
| 2012/0023375 A1 | 1/2012 | Dutta et al. | |
| 2012/0036309 A1 | 2/2012 | Dillow et al. | |
| 2012/0117029 A1* | 5/2012 | Gold | G06F 11/1451 707/651 |
| 2012/0198175 A1 | 8/2012 | Atkisson | |
| 2012/0330954 A1 | 12/2012 | Sivasubramanian et al. | |
| 2013/0042052 A1 | 2/2013 | Colgrove et al. | |
| 2013/0046995 A1 | 2/2013 | Movshovitz | |
| 2013/0047029 A1 | 2/2013 | Ikeuchi et al. | |
| 2013/0091102 A1 | 4/2013 | Nayak | |
| 2013/0205110 A1 | 8/2013 | Kettner | |
| 2013/0227236 A1 | 8/2013 | Flynn et al. | |
| 2013/0275391 A1 | 10/2013 | Batwara et al. | |
| 2013/0275656 A1 | 10/2013 | Talagala et al. | |
| 2013/0283058 A1 | 10/2013 | Fiske et al. | |
| 2013/0290648 A1 | 10/2013 | Shao et al. | |
| 2013/0318314 A1 | 11/2013 | Markus et al. | |
| 2013/0339303 A1 | 12/2013 | Potter et al. | |
| 2014/0052946 A1 | 2/2014 | Kimmel | |
| 2014/0068791 A1 | 3/2014 | Resch | |
| 2014/0089730 A1 | 3/2014 | Watanabe et al. | |
| 2014/0101361 A1 | 4/2014 | Gschwind | |
| 2014/0143517 A1 | 5/2014 | Jin et al. | |
| 2014/0172929 A1 | 6/2014 | Sedayao et al. | |
| 2014/0201150 A1 | 7/2014 | Kumarasamy et al. | |
| 2014/0215129 A1 | 7/2014 | Kuzmin et al. | |
| 2014/0229131 A1 | 8/2014 | Cohen et al. | |
| 2014/0229452 A1* | 8/2014 | Serita | G06F 16/1748 707/692 |
| 2014/0281308 A1 | 9/2014 | Lango et al. | |
| 2014/0325115 A1 | 10/2014 | Ramsundar et al. | |
| 2015/0120666 A1 | 4/2015 | Otsuka | |
| 2015/0178193 A1 | 6/2015 | Song et al. | |
| 2015/0234709 A1 | 8/2015 | Koarashi | |
| 2015/0244775 A1 | 8/2015 | Vibhor et al. | |
| 2015/0278534 A1 | 10/2015 | Thiyagarajan et al. | |
| 2016/0019114 A1 | 1/2016 | Han et al. | |
| 2016/0098191 A1 | 4/2016 | Golden et al. | |
| 2016/0098199 A1 | 4/2016 | Golden et al. | |
| 2016/0171029 A1 | 6/2016 | Sanvido et al. | |

FOREIGN PATENT DOCUMENTS

| | | |
|---|---|---|
| CN | 104025010 B | 11/2016 |
| EP | 2717153 A1 | 4/2014 |
| EP | 3066610 A1 | 9/2016 |
| EP | 3082047 A1 | 10/2016 |

(56) References Cited

FOREIGN PATENT DOCUMENTS

| EP | 3120235 A | 1/2017 |
|---|---|---|
| JP | 2007-087036 A | 4/2007 |
| JP | 2007-094472 A | 4/2007 |
| JP | 2008-250667 A | 10/2008 |
| JP | 2010-211681 A | 9/2010 |
| WO | WO-1995/002349 A1 | 1/1995 |
| WO | WO-1999/013403 A1 | 3/1999 |
| WO | WO-2008/102347 A1 | 8/2008 |
| WO | WO-2010/071655 A1 | 6/2010 |

OTHER PUBLICATIONS

Microsoft Corporation, "Fundamentals of Garbage Collection", Retrieved Aug. 30, 2013 via the WayBack Machine, 11 pages.
International Search Report & Written Opinion, PCT/US2015/063444, dated Mar. 3, 2016, 10 pages.

* cited by examiner

DEDUPLICATING PATTERNED DATA IN A STORAGE SYSTEM

CROSS-REFERENCE TO RELATED APPLICATION

This is a Continuation Application of U.S. patent application Ser. No. 14/569,624, filed Dec. 12, 2014.

BACKGROUND OF THE INVENTION

Field of the Invention

This invention relates to computer networks and, more particularly, to efficiently storing data in a storage system.

Description of the Related Art

As computer memory storage and data bandwidth increase, so does the amount and complexity of data that businesses daily manage. A distributed storage system may be coupled to client computers interconnected by one or more networks. If any portion of the distributed storage system has poor performance, company operations may be impaired. A distributed storage system therefore maintains high standards for data availability and high-performance functionality.

The distributed storage system comprises physical volumes, which may be solid-state devices or partitions of a storage device. Software applications, such as a logical volume manager or a disk array manager, provide a means of allocating space on mass-storage arrays. In addition, this software allows a system administrator to create units of storage groups including logical volumes. Storage virtualization provides an abstraction (separation) of logical storage from physical storage in order to access logical storage without end-users identifying physical storage.

To support storage virtualization, a volume manager performs input/output (I/O) redirection by translating incoming I/O requests using logical addresses from end-users into new requests using addresses associated with physical locations in the storage devices. As some storage devices may include additional address translation mechanisms, such as address translation layers that may be used in solid-state storage devices, the translation from a logical address to another address mentioned above may not represent the only or final address translation. Redirection utilizes metadata stored in one or more mapping tables. In addition, information stored in one or more mapping tables may be used for storage deduplication and mapping virtual sectors at a specific snapshot level to physical locations. As the amount of data to maintain in a storage system grows, the cost of storing the data likewise grows.

In view of the above, systems and methods for efficiently storing data in a storage system are desired.

SUMMARY OF THE INVENTION

Various embodiments of a computer system and methods for efficiently storing data in a storage system are contemplated.

In various embodiments, a data storage subsystem coupled to a network receives read and write requests on the network from a client computer. The data storage subsystem includes multiple data storage locations on multiple storage devices. The data storage subsystem also includes at least one mapping table. The mapping table includes a plurality of entries, with each of the entries including a tuple with a key. The entry may also include a pointer to a physical location within the multiple storage devices.

A data storage controller determines whether data to store in the storage subsystem has a repeating pattern. In some embodiments, repeating patterns are intermingled with non-pattern data. Rather than store the repeating pattern on the storage devices, the controller stores information in a header on the storage devices. The information provides an identification of the pattern and its location(s). In various embodiments, the information includes at least an offset for the first instance of the repeating pattern, a pattern length, and an identification of the pattern, and locations of the pattern data with respect to the intermingled non-pattern data. In this manner, multiple instances of the pattern need not be stored. Reads of the data result in reconstruction of the data from the information stored in the header.

These and other embodiments will become apparent upon consideration of the following description and accompanying drawings.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Figure 1:
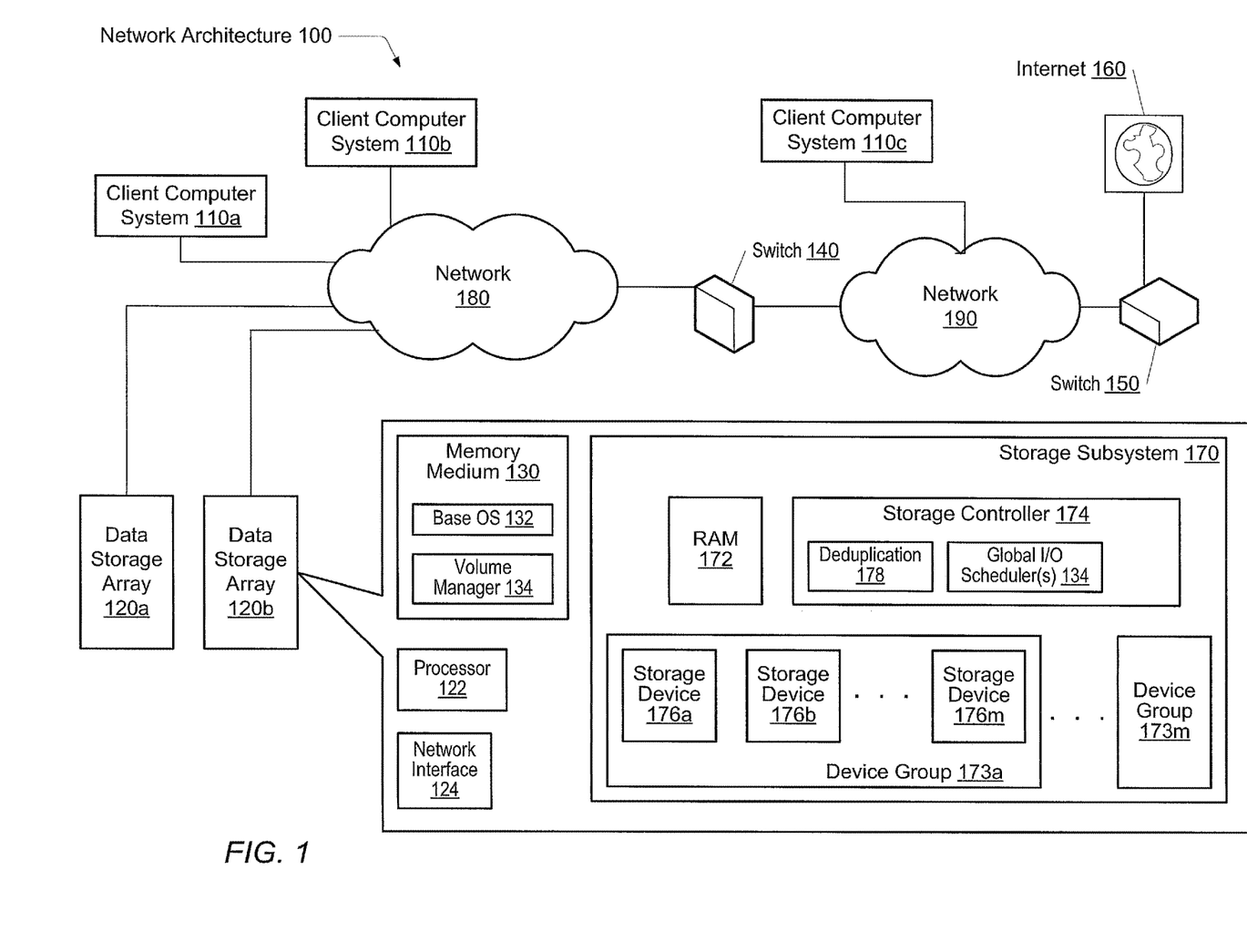
FIG. 1 is a generalized block diagram illustrating one embodiment of network architecture.

Referring to FIG. 1, a generalized block diagram of one embodiment of a network architecture 100 is shown. As described further below, one embodiment of network architecture 100 includes client computer systems 110a-110b interconnected to one another through a network 180 and to data storage arrays 120a-120b. Network 180 may be coupled to a second network 190 through a switch 140. Client computer system 110c is coupled to client computer systems 110a-110b and data storage arrays 120a-120b via network 190. In addition, network 190 may be coupled to the Internet 160 or otherwise outside network through switch 150.

It is noted that in alternative embodiments, the number and type of client computers and servers, switches, networks, data storage arrays, and data storage devices is not limited to those shown in FIG. 1. At various times one or more clients may operate offline. In addition, during operation, individual client computer connection types may change as users connect, disconnect, and reconnect to network architecture 100. Further, while the present description generally discusses network attached storage, the systems and methods described herein may also be applied to directly attached storage systems and may include a host operating system configured to perform one or more aspects of the described methods. Numerous such alternatives are possible and are contemplated. A further description of each of the components shown in FIG. 1 is provided shortly. First, an overview of some of the features provided by the data storage arrays 120a-120b is described.

In the network architecture 100, each of the data storage arrays 120a-120b may be used for the sharing of data among different servers and computers, such as client computer systems 110a-110c. In addition, the data storage arrays 120a-120b may be used for disk mirroring, backup and restore, archival and retrieval of archived data, and data migration from one storage device to another. In an alternate embodiment, one or more client computer systems 110a-110c may be linked to one another through fast local area networks (LANs) in order to form a cluster. Such clients may share a storage resource, such as a cluster shared volume residing within one of data storage arrays 120a-120b.

Each of the data storage arrays 120a-120b includes a storage subsystem 170 for data storage. Storage subsystem 170 may comprise a plurality of storage devices 176a-176m. These storage devices 176a-176m may provide data storage services to client computer systems 110a-110c. Each of the storage devices 176a-176m uses a particular technology and mechanism for performing data storage. The type of technology and mechanism used within each of the storage devices 176a-176m may at least in part be used to determine the algorithms used for controlling and scheduling read and write operations to and from each of the storage devices 176a-176m. For example, the algorithms may locate particular physical locations corresponding to the operations. In addition, the algorithms may perform input/output (I/O) redirection for the operations, removal of duplicate data in the storage subsystem 170, and support one or more mapping tables used for address redirection and deduplication.

The logic used in the above algorithms may be included in one or more of a base operating system (OS) 132, a volume manager 134, within a storage subsystem controller 174, control logic within each of the storage devices 176a-176m, or otherwise. Additionally, the logic, algorithms, and control mechanisms described herein may comprise hardware and/or software.

Each of the storage devices 176a-176m may be configured to receive read and write requests and comprise a plurality of data storage locations, each data storage location being addressable as rows and columns in an array. In one embodiment, the data storage locations within the storage devices 176a-176m may be arranged into logical, redundant storage containers or RAID arrays (redundant arrays of inexpensive/independent disks).

In some embodiments, each of the storage devices 176a-176m may include or be further coupled to storage consisting of solid-state memory to store persistent data. In one embodiment, the included solid-state memory comprises solid-state drive (SSD) technology. A Solid-State Disk (SSD) may also be referred to as a Solid-State Drive.

Storage array efficiency may be improved by creating a storage virtualization layer between user storage and physical locations within storage devices 176a-176m. In one embodiment, a virtual layer of a volume manager is placed in a device-driver stack of an operating system (OS), rather than within storage devices or in a network. A volume manager or a disk array manager is used to support device groups 173a-173m.

In one embodiment, one or more mapping tables may be stored in the storage devices 176a-176m, rather than memory, such as RAM 172, memory medium 130 or a cache within processor 122. The storage devices 176a-176 may be SSDs utilizing Flash memory. The low read access and latency times for SSDs may allow a small number of dependent read operations to occur while servicing a storage access request from a client computer. The dependent read operations may be used to access one or more indexes, one or more mapping tables, and user data during the servicing of the storage access request.

The information within a mapping table may be compressed. A particular compression algorithm may be chosen to allow identification of individual components, such as a key within a record among multiple records. Therefore, a search for a given key among multiple compressed records may occur. If a match is found, only the matching record may be decompressed. Compressing data within records of a mapping table may further enable fine-grained level mapping.

Network architecture 100 includes client computer systems 110a-110c interconnected through networks 180 and 190 to one another and to data storage arrays 120a-120b. Networks 180 and 190 may include a variety of techniques including wireless connection, direct local area network (LAN) connections, wide area network (WAN) connections such as the Internet, a router, storage area network, Ethernet, and others. Networks 180 and 190 may comprise one or more LANs that may also be wireless. Switch 140 may utilize a protocol associated with both networks 180 and 190. The network 190 may interface with a set of communications protocols used for the Internet 160 such as the Transmission Control Protocol (TCP) and the Internet Protocol (IP), or TCP/IP. Switch 150 may be a TCP/IP switch.

Client computer systems 110a-110c are representative of any number of stationary or mobile computers such as desktop personal computers (PCs), servers, server farms, workstations, laptops, handheld computers, servers, personal digital assistants (PDAs), smart phones, and so forth. Each of the client computer systems 110a-110c may include a hypervisor used to support virtual machines (VMs).

Each of the data storage arrays 120a-120b may be used for the sharing of data among different servers, such as the client computer systems 110a-110c. Each of the data storage arrays 120a-120b includes a storage subsystem 170 for data storage. Storage subsystem 170 may comprise a plurality of storage devices 176a-176m. Each of these storage devices 176a-176m may be an SSD. A controller 174 may comprise logic for handling received read/write requests. A random-access memory (RAM) 172 may be used to batch operations, such as received write requests. In various embodiments, when batching write operations (or other operations) non-volatile storage (e.g., NVRAM) may be used.

The base OS 132, the volume manager 134 (or disk array manager 134), any OS drivers (not shown) and other software stored in memory medium 130 may provide functionality providing access to files and the management of these functionalities. The base OS 132 and the OS drivers may comprise program instructions stored on the memory medium 130 and executable by processor 122 to perform one or more memory access operations in storage subsystem 170 that correspond to received requests. Each of the data storage arrays 120a-120b may use a network interface 124 to connect to network 180. Similar to client computer systems 110a-110c, in one embodiment, the functionality of network interface 124 may be included on a network adapter card.

In addition to the above, each of the storage controllers 174 within the data storage arrays 120a-120b may support storage array functions such as snapshots, replication and high availability. In addition, each of the storage controllers 174 may support a virtual machine environment that comprises a plurality of volumes with each volume including a plurality of snapshots. In one example, a storage controller 174 may support hundreds of thousands of volumes, wherein each volume includes thousands of snapshots. In one embodiment, a volume may be mapped in fixed-size sectors, such as a 4-kilobyte (KB) page within storage devices 176a-176m. In another embodiment, a volume may be mapped in variable-size sectors such as for write requests. A volume ID, a snapshot ID, and a sector number may be used to identify a given volume.

An address translation table may comprise a plurality of entries, wherein each entry holds a virtual-to-physical mapping for a corresponding data component. This mapping table may be used to map logical read/write requests from each of the client computer systems 110a-110c to physical locations in storage devices 176a-176m. A "physical" pointer value may be read from the mapping table during a lookup operation corresponding to a received read/write request. This physical pointer value may then be used to locate a physical location within the storage devices 176a-176m. It is noted the physical pointer value may be used to access another mapping table within a given storage device of the storage devices 176a-176m. Consequently, one or more levels of indirection may exist between the physical pointer value and a target storage location.

Figure 2:
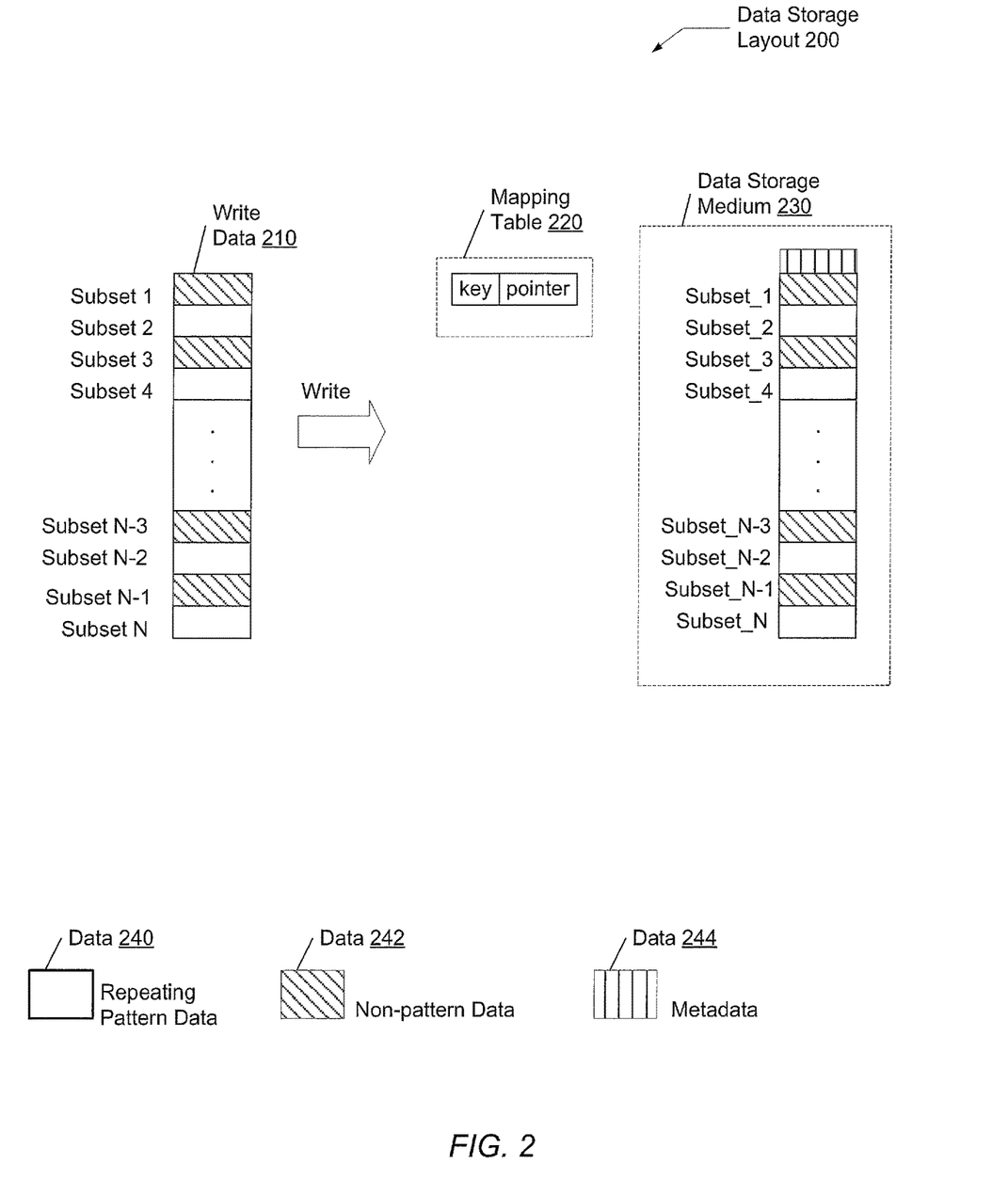
FIG. 2 is a generalized block diagram of one embodiment of a data storage layout.

Referring to FIG. 2, a generalized block diagram of one embodiment of a data storage layout 200 is shown. As shown, write data 210 is received for storage in a data storage medium 230. In the example shown, the write data 210 includes N subsets, wherein N is an integer. Each subset may correspond to a given storage unit size or subunit size depending on the particular storage architecture. The N subsets include non-pattern data 242 and repeating pattern data 240. As shown, the non-pattern data 242 and the repeating pattern data 240 alternate among subsets within the write data 210. However, the pattern and non-pattern data need not strictly alternate. Rather, other arrangements among the subsets are possible and contemplated.

In various embodiments, the number of bits in a detectable bit pattern may be programmable and the number of instances of a pattern to be detected may be programmable. For example, bit patterns of up to 4, 8, or some other number of bits may be identifiable. Numerous methods of identifying bit patterns are known in the art and are contemplated. For example, various embodiments may compare bits of data to predetermined patterns for identification. As a simple example, there are 16 possible combinations for a pattern of 4 bits (0000-1111). These 16 patterns could be maintained in a table, array, or otherwise. Alternatively, such patterns may be detected using binary logic. Still further, various forms of automata or state machines may be used to detect patterns. Numerous such approaches are possible and are contemplated. In some embodiments, detection logic may compare chunks of M-bytes where M is an integer greater than or equal to one. For example, the byte pattern 0x0A that repeats within a subset may be detected as a repeating pattern, where a single instance of the bit pattern 0x0A has a size of a byte. As used herein, the notation "0x" indicates a hexadecimal value. A comparison of a first byte and a contiguous second byte that results in a match (i.e., the bit pattern in the first byte matches that of the second) indicates at least a start of a repeating pattern. Similarly, a comparison of a first 2-byte value and a contiguous second 2-byte value that results in a match indicates at least a start of a repeating pattern.

In some embodiments, a programmable limit may be established for the maximum size of a pattern. For example, in an embodiment where a repeating pattern cannot exceed four bytes in size, a comparison of a first 4-byte value and a contiguous second 4-byte value that results in a match may indicate the start of a repeating pattern (i.e., a four byte pattern has been detected to occur twice). However, the pattern 0x12345678 0x12345678 that repeats within the subset would not be identified (or qualify) as a repeating pattern since the pattern length is 8 bytes.

In various embodiments, another limit or threshold may be used for the number of contiguous instances of a given pattern needed to qualify for a repeating pattern. For example, if such a threshold value is set at 4, four or more contiguous instances of a pattern would qualify as a repeating pattern, but two or three would not. In some embodiments, the threshold number of contiguous instances of the bit pattern need to qualify as a repeating pattern may be set to half of a subset. In yet other embodiments, the write request may include an indication and/or identification of patterns of data within a write request. The qualifications for identifying a series of repeating patterns may determine how the data is stored among the mapping table and the data storage.

In the example shown in FIG. 2, the repeating patterns in the write data 210 may represent a same pattern. For example, the subset 2, the subset 4, the subset N−2 and so forth, may each store the same repeating pattern data (e.g., instances of a same pattern, though not necessarily the same number of instances). Alternatively, one or more of the subsets in the write data 210 that store a repeating pattern may store a pattern different from other subsets. For example, the subset 2 may store a series of the repeating pattern 0x 26 26, whereas the subset 4 may store a series of the repeating pattern 0x 89AB 89AB.

When the write data 210 is written to the data storage medium 230, each of a mapping table 220 and the data storage medium 230 may be updated. In the example shown, the mapping table 220 may typically include at least a key and a pointer. In one embodiment, the key may be an identifier for the write data 210 being stored in the data storage medium 230 and the pointer may be an identification (e.g., an address) corresponding to a location within the data storage medium 230 where the write data 210 is to be stored. For example, the data 210 may be stored as a block and the pointer may identifying an address (e.g., the beginning) of the block. In this example, the mapping table 220 has one entry corresponding to the write data 210 and all of the write data 210 is stored in the data storage medium 230.

The data storage medium 230 may represent an entire allocated block for a write operation or a subset of the allocated block. As shown, the data storage medium 230 stores each of the subsets of the write data 210. Additionally, the data storage medium 230 includes metadata 244. The metadata 244 may store data protection information, such as intra-device protection data, checksums, and/or otherwise. The metadata 244 may store log data. Additionally, the metadata 244 may store data location information such as volume identifiers, sector numbers, data chunk and offset numbers, track numbers, and so forth. Although the metadata 244 is shown at the top of the data storage medium 230, in other examples, the metadata 244 may be stored at the bottom of data storage medium 230. Alternatively, the information in the metadata 244 may be distributed at the top or bottom of the data storage medium 230 and within headers in each of the subsets.

Figure 3:
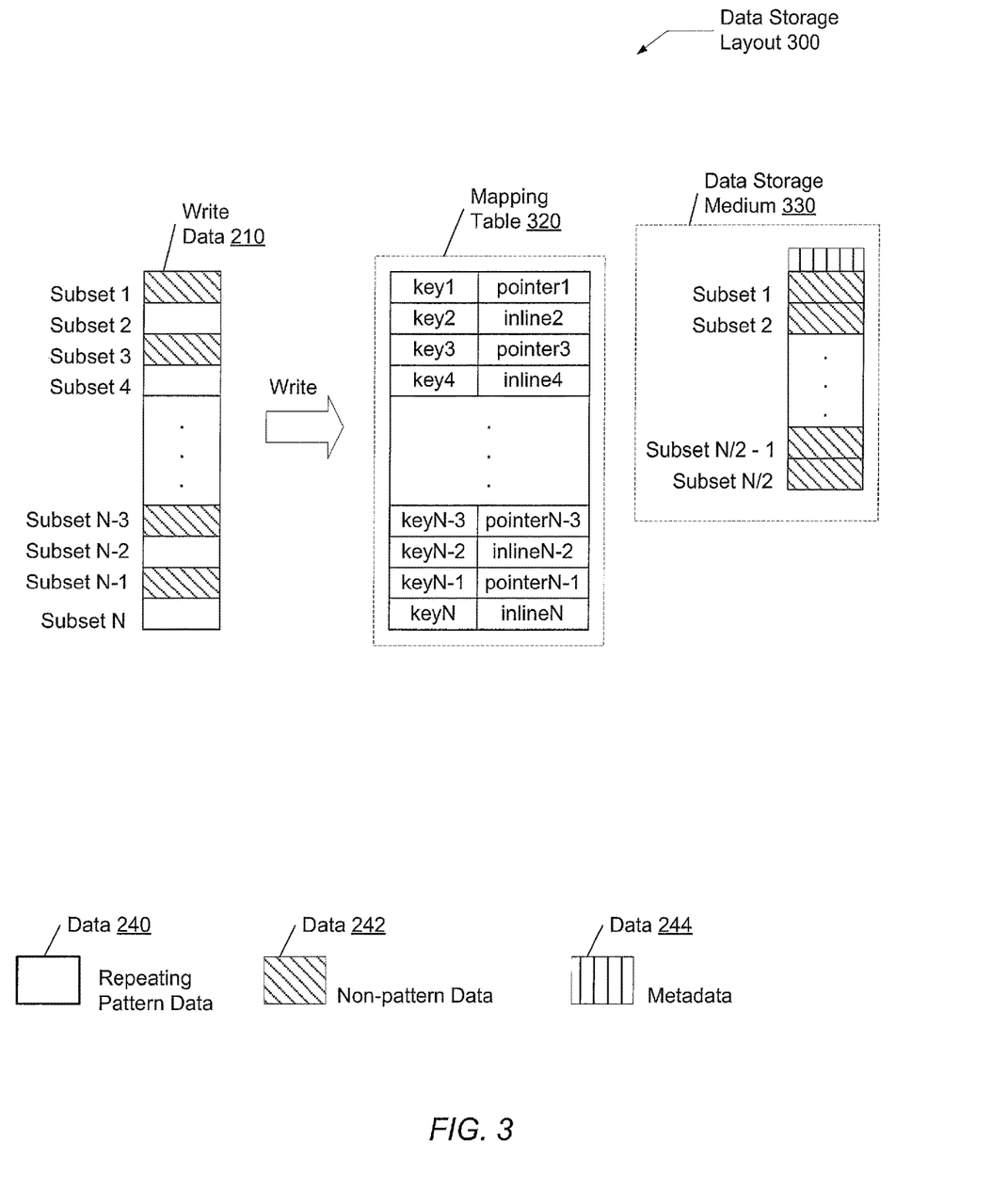
FIG. 3 is a generalized block diagram of another embodiment of a data storage layout.

Turning now to FIG. 3, a generalized block diagram of another embodiment of a data storage layout 300 is shown improved data storage. In this embodiment, a mapping table 320 stores information identifying pattern data intermingled with non-pattern data. The non-pattern data is stored to a data storage medium 330, while the pattern data is not. As shown, a write request again includes the write data 210, which is to be stored in a data storage medium. Responsive to the write request, each of a mapping table 320 and the data storage medium 330 is updated. The mapping table 320 has multiple entries for the write data 210. In the example shown, each of the N subsets within the write data 210 has a corresponding entry in the mapping table 320. Each of the keys in the mapping table 320 is unique for a corresponding subset within the write data 210. Similarly, each of the pointers in the mapping table 320 is unique for a corresponding subset within the write data 210.

For subsets within the write data 210 that include a repeating pattern, the corresponding entries in the mapping table 320 store information identifying the pattern data. For example, one or more status fields may be set to indicate the stored data does not include a pointer value. Rather, at least an indication of the repeating pattern is stored. In various embodiments, a single instance of the pattern may be stored in an entry of the mapping table 320, along with a number of instances of the pattern. For example, if Subset 2 stores a repeating pattern of twenty instances of 0x4, an identification of the pattern 0x4 may be stored in the entry for Subset 2 along with an identification of the number of instances (twenty). In the example shown, only the non-pattern data is stored in the storage medium 330 requiring only half the storage of the example of FIG. 2.

Figure 4:
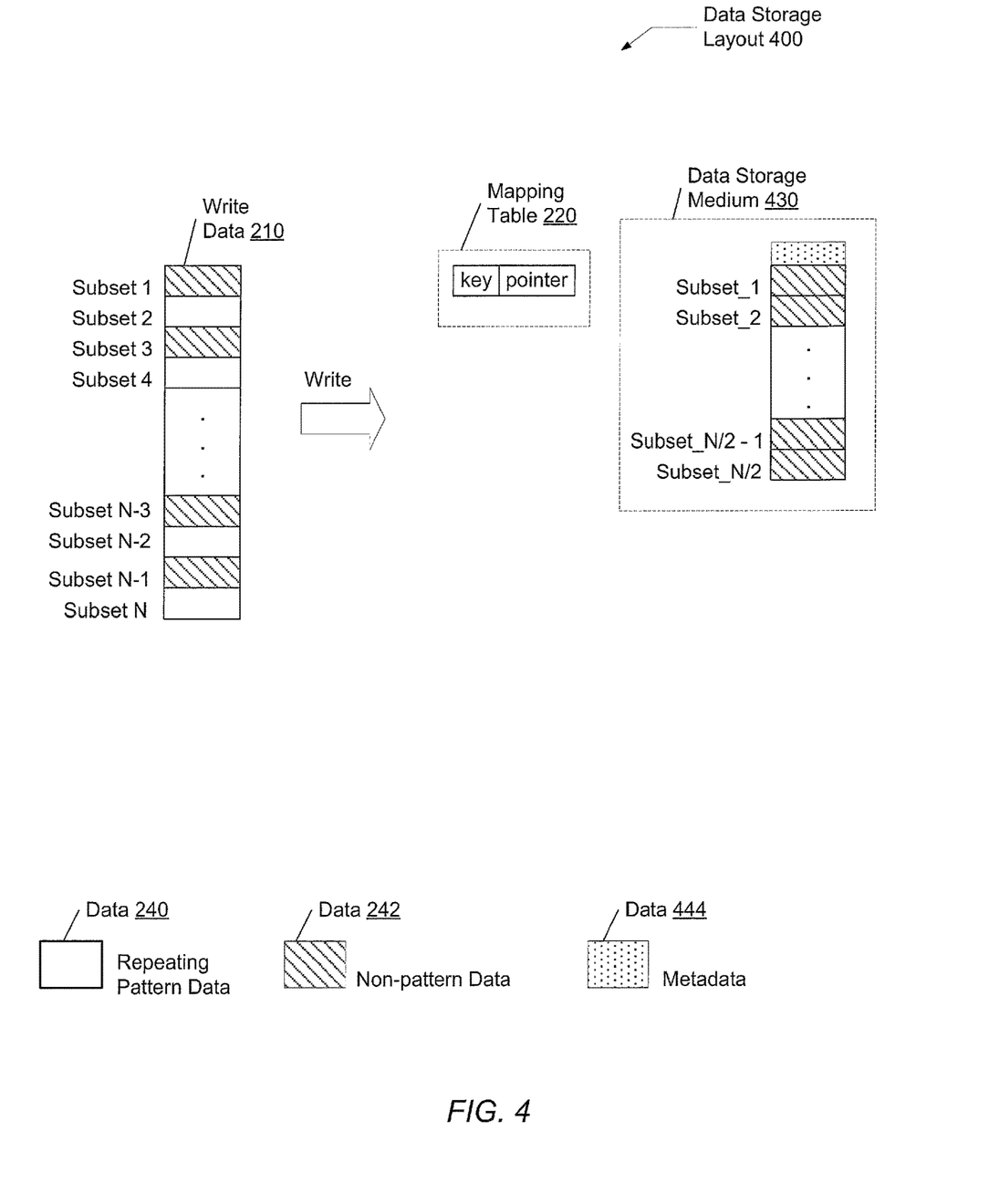
FIG. 4 is a generalized block diagram of yet another embodiment of a data storage layout.

Referring now to FIG. 4, a generalized block diagram of yet another embodiment of a data storage layout 400 is shown. In this embodiment, the non-pattern data of the write data 210 is stored in the data storage medium as in FIG. 3. However, pattern identifying data is also stored in the data storage medium using the above described approach for reducing the amount of storage required. As shown, s write request includes the write data 210, which is to be stored in a data storage medium. When the write data 210 is written to the data storage medium 430, each of a mapping table 220 and the data storage medium 430 is updated. The mapping table 220 has one entry corresponding to the write data 210. The key is an identifier for the write data 210 being stored in the data storage medium. The pointer is an address of a target physical location within the data storage medium where the write data 210 is to be stored.

In the example shown, as only the non-pattern data is generally stored in the medium 230 the data storage medium 430, the required storage is approximately half that of FIG. 2. For subsets within the write data 210 that qualify as a series of repeating patterns, there may be no corresponding entries in the mapping table 220 as there were in FIG. 3. Additionally, there are no subsets in the data storage medium 430 allocated for the repeating pattern data. Rather, the metadata 444 within the data storage medium 430 stores identifications of repeating patterns. The information in the metadata 444 may store information as described earlier for metadata 144 in FIG. 2. Additionally, for each series of repeating patterns, the metadata 444 stores an identification of the pattern (e.g., a single instance of the pattern), a length of the series of the repeating pattern (or number of instances of a pattern), and an offset for the series of repeating patterns.

For example, subset 2 in the write data 210 may store a repeating pattern, such as 0x01 0x01. The metadata 444 may store a single instance of the pattern such as 0x01 or an instance of the repeating pattern 0x01 0x01. In addition, the metadata 444 may store an indication of a number of instances of the pattern or repeating pattern. Further, the metadata 444 may store an offset within the write data 210 of the repeating pattern. For example, if Subset 1 is at an offset of 0 in the write data 210, Subset 2 is at an offset of 1, Subset 3 is at an offset of 2, and so on. In various embodiments, the metadata also identifies an offset for each of the non-pattern subsets of data. In this manner, the relative locations of both the pattern and non-pattern are known and the original data 210 can be reconstructed as needed. In such a manner, the write data 210 may be efficiently stored in a data storage medium with the sizes of the corresponding mapping table 220 and the corresponding data storage medium 430 being reduced from the size of the write data 210. In various embodiments, the efficient storage of the write data 210 may be performed in a distributed data storage system utilizing solid-state devices. For example, the network architecture 100 may use the efficient storage of the write data.

Figure 5:
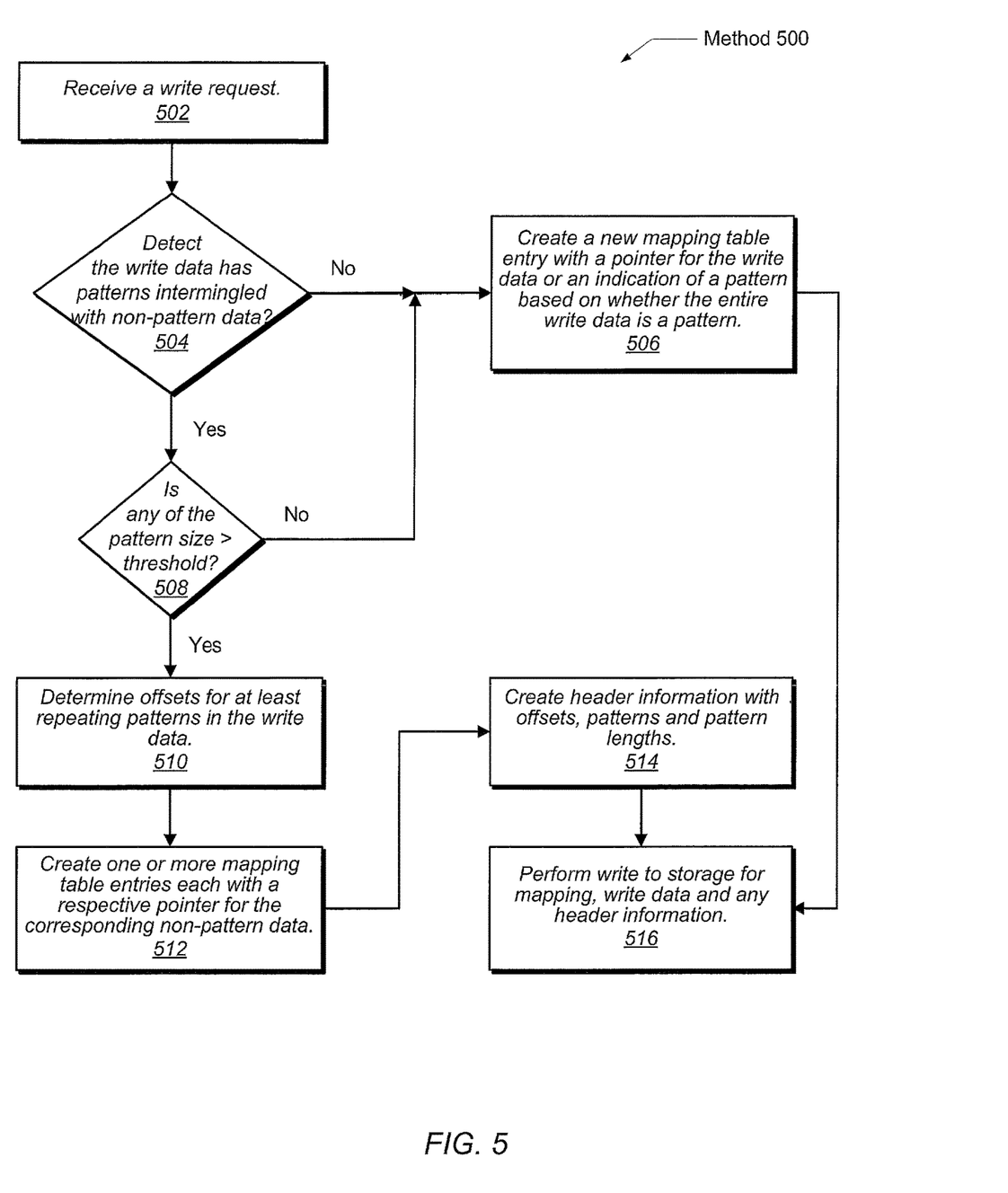
FIG. 5 is a generalized flow diagram of one embodiment of a method corresponding to a received write request.

Turning now to FIG. 5, a generalized flow diagram of one embodiment of a method 500 corresponding to a received write request is shown. The components embodied in the data storage layouts and the network architecture 100 described above may generally operate in accordance with method 500. For purposes of discussion, the steps in this embodiment are shown in sequential order. However, some steps may occur in a different order than shown, some steps may be performed concurrently, some steps may be combined with other steps, and some steps may be absent in another embodiment.

In block 502, a write request is received. In some embodiments, an indication of a series of patterns is provided in the write request. In other embodiments, patterns of data are detected. For example, control logic may compare contiguous chunks of M-bytes, wherein matches indicate a pattern. In various embodiments, the control logic is within the data storage controller 174, though it may be located elsewhere. The integer M may be any positive value from 1 to a limit, such as 4, in one example. A same byte pattern of 0x 00 that repeats within a given subset may be detected as a repeating pattern. In some embodiments, the subset is a sector in a SSD. A comparison of a first portion of data and a contiguous second portion of data that results in a match indicates at least a start of a repeating pattern.

If the control logic does not detect the write data of the write request has a series of patterns intermingled with non-pattern data (conditional block 504), then in block 506, a new mapping table entry is created with a pointer to (or other identification of) a location in the SSDs for the write data. Alternatively, if the entire write data is a series of patterns, the new mapping table entry includes an indication of the pattern. However, in other embodiments, the mapping table includes a pointer to the series of patterns in the write data and an identification of the pattern is stored in the storage medium rather than the actual entire write data. The write data may be the size of an allocated block that comprises a number of sectors. In some examples, the block includes 64 sectors. In other examples, the block includes 128 sectors. Any number of sectors, or subsets, may be used.

If the control logic does detect the write data of the write request has a series of patterns intermingled with non-pattern data (conditional block 504), and (in at least some embodiments) the size of the series of patterns is greater than a size threshold (conditional block 508), then in block 510, the offsets for at least the repeating pattern in the write data is determined. In some embodiments, the offsets may use the granularity of a subset or a sector. An indication of the length of the pattern and the pattern itself may be stored with other metadata. In some embodiments, a stride of offsets for at least one repeating pattern is determined. The stride may also be stored with the pattern and the length of the pattern. A stride of offsets for the non-pattern data may be additionally determined and stored with the pattern and the length of the pattern. For example, if the repeating pattern data occurs every other subset (or other unit) as was shown in FIG. 4, then a stride of 2 may be used to indicate every other subset. In such an embodiment, storing an offset for every subset may not be needed. Rather, an offset of the first subset may be identified along with a stride and a number of subsets. In block 512, one or more mapping table entries, each with a respective pointer for the corresponding non-pattern data, may be created.

In block 514, header information is created with at least offsets, a possible stride of offsets, pattern lengths and patterns for the detected series of repeating patterns. Offsets or a stride of offsets for the non-pattern data may also be included. In block 516, a write operation is performed to the storage medium for the mapping and header information and the non-pattern data.

Figure 6:
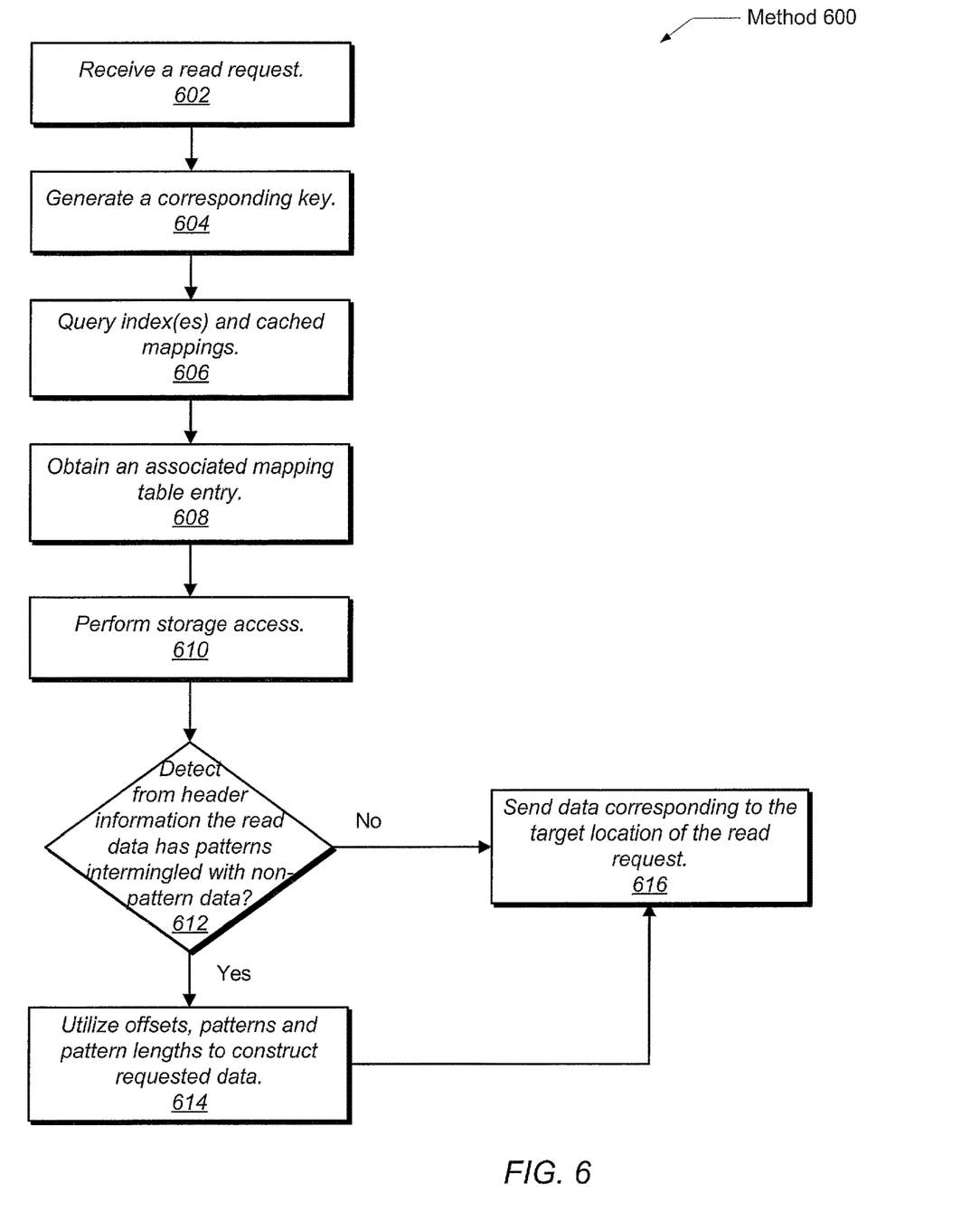
FIG. 6 is a generalized flow diagram of one embodiment of a method corresponding to a received read request.

Turning now to FIG. 6, a generalized flow diagram of one embodiment of a method 600 corresponding to a received read request is shown. The components embodied in the data storage layouts and the network architecture 100 described above may generally operate in accordance with method 600. For purposes of discussion, the steps in this embodiment are shown in sequential order. However, some steps may occur in a different order than shown, some steps may be performed concurrently, some steps may be combined with other steps, and some steps may be absent in another embodiment.

In block 602, a read request is received. A key generator may receive one or more requester data inputs. The received read request may identify a particular volume, sector and length. In block 604, the key generator may produce a query key value that includes a volume identifier (ID), a logical or virtual address, a snapshot ID, and a sector number. Other combinations are possible and other or additional values may be utilized as well. In block 606, different portions of the query key value may be compared to values stored in columns that may or may not be contiguous within a mapping table. In various embodiments, the mapping table is an address translation directory table. To provide the different portions of the query key value to the columns within the mapping table, one or more index tables were accessed beforehand.

In block 608, an associated mapping table entry is obtained. The mapping table result is used in block 610 to perform a storage access that corresponds to the target location of the original read request. If stored header information corresponding to the read request indicates the read data has patterns intermingled with non-pattern data (conditional block 612), then in block 614, the information such as offsets, strides of offsets, pattern lengths and patterns stored in the header information is used to reconstruct the requested data. Both non-pattern data and reconstructed pattern data may be combined to recreate the original write data. In block 616, the data corresponding to the target location of the read request is sent to the requester.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
receiving a write request to write data to a storage device, wherein the data includes at least one or more instances of the patterned data and one or more instances of non-patterned data;
detecting, within the pattern data, whether a number of contiguous instances of a particular pattern is above a predefined threshold;
in response to detecting that the number of contiguous instances of the particular pattern is above the predefined threshold,
retaining information describing the patterned data and one or more locations of the patterned data within the data; and
writing only the non-patterned data to the data storage device.

2. The method of claim 1 wherein the one or more instances of the patterned data comprises a number of contiguous instances of a bit pattern, and wherein retaining information describing the patterned data includes storing fewer than the number of contiguous instances of the bit pattern in the storage system.

3. The method of claim 2 wherein a size of a single instance of the bit pattern does not exceed a programmable size threshold.

4. The method of claim 1 further comprising:
determining respective offsets for the one or more instances of the patterned data; and
storing the respective offsets for the at least one repeating pattern in the information describing the patterned data and one or more locations of the patterned data within the data.

5. The method of claim 4 further comprising:
determining respective offsets for the non-patterned data; and storing the respective offsets for the non-patterned data in the information describing the patterned data and one or more locations of the patterned data within the data.

6. The method of claim 1 further comprising:
determining a stride of offsets for one or more instances of the patterned data and the non-patterned data; and
storing the stride of offsets in the information describing the patterned data and one or more locations of the patterned data within the data.

7. The method of claim 1 further comprising, response to receiving a read request, reading the information describing the patterned data and one or more locations of the patterned data within the data to construct data requested by the read request.

8. The method of claim 1 further comprising storing the non-patterned data in contiguous data spaces with no storage for the one or more instances of the patterned data received in the write request.

9. A storage system that includes a plurality of storage devices, the storage system including a computer processor and a computer memory, the computer memory including computer program instructions that, when executed by the computer processor, cause the storage system to carry out the steps of:
receiving a write request to write data to a storage device, wherein the data includes at least one or more instances of the patterned data and one or more instances of non-patterned data;
detecting, within the pattern data, whether a number of contiguous instances of a particular pattern is above a predefined threshold;
in response to detecting that the number of contiguous instances of the particular pattern is above the predefined threshold,
retaining information describing the patterned data and one or more locations of the patterned data within the data; and
writing only the non-patterned data to the data storage device.

10. The storage system of claim 9 wherein the one or more instances of the patterned data comprises a number of contiguous instances of a bit pattern, and wherein retaining information describing the patterned data includes storing fewer than the number of contiguous instances of the bit pattern in the storage system.

11. The storage system of claim 10 wherein a size of a single instance of the bit pattern does not exceed a programmable size threshold.

12. The storage system of claim 9 further comprising computer program instructions that, when executed by the computer processor, cause the storage system to carry out the steps of:
determining respective offsets for the one or more instances of the patterned data; and
storing the respective offsets for the at least one repeating pattern in the information describing the patterned data and one or more locations of the patterned data within the data.

13. The storage system of claim 9 further comprising computer program instructions that, when executed by the computer processor, cause the storage system to carry out the steps of:
determining respective offsets for the non-patterned data; and
storing the respective offsets for the non-patterned data in the information describing the patterned data and one or more locations of the patterned data within the data.

14. The storage system of claim 9 further comprising computer program instructions that, when executed by the computer processor, cause the storage system to carry out the steps of:
determining a stride of offsets for one or more instances of the patterned data and the non-patterned data; and
storing the stride of offsets in the information describing the patterned data and one or more locations of the patterned data within the data.

15. The storage system of claim 9 further comprising computer program instructions that, when executed by the computer processor, cause the storage system to carry out the step of, response to receiving a read request, reading the information describing the patterned data and one or more locations of the patterned data within the data to construct data requested by the read request.

16. The storage system of claim 9 further comprising computer program instructions that, when executed by the computer processor, cause the storage system to carry out the step of storing the non-patterned data in contiguous data spaces with no storage for the one or more instances of the patterned data received in the write request.

17. An apparatus for use in a storage system that includes a plurality of storage devices, the apparatus including a computer processor and a computer memory, the computer memory including computer program instructions that, when executed by the computer processor, cause the storage system to carry out the steps of:
receiving a write request to write data to a storage device, wherein the data includes at least one or more instances of the patterned data and one or more instances of non-patterned data;
detecting, within the pattern data, whether a number of contiguous instances of a particular pattern is above a predefined threshold;
in response to detecting that the number of contiguous instances of the particular pattern is above the predefined threshold,
retaining information describing the patterned data and one or more locations of the patterned data within the data; and
writing only the non-patterned data to the data storage device.

18. The apparatus of claim 17 wherein the one or more instances of the patterned data comprises a number of contiguous instances of a bit pattern, and wherein retaining information describing the patterned data includes storing fewer than the number of contiguous instances of the bit pattern in the storage system.

19. The apparatus of claim 17 further comprising computer program instructions that, when executed by the computer processor, cause the storage system to carry out the steps of:
determining respective offsets for the one or more instances of the patterned data; and
storing the respective offsets for the at least one repeating pattern in the information describing the patterned data and one or more locations of the patterned data within the data.

20. The apparatus of claim 17 further comprising computer program instructions that, when executed by the computer processor, cause the storage system to carry out the steps of:
determining respective offsets for the non-patterned data; and storing the respective offsets for the non-patterned data in the information describing the patterned data and one or more locations of the patterned data within the data.

\* \* \* \* \*